(12) United States Patent
Lee et al.

(10) Patent No.: US 12,399,251 B2
(45) Date of Patent: Aug. 26, 2025

(54) SYSTEM AND METHOD FOR TERMINAL POSITIONING

(71) Applicant: FOUNDATION FOR RESEARCH AND BUSINESS, SEOUL NATIONAL UNIVERSITY OF SCIENCE AND TECHNOLOGY, Seoul (KR)

(72) Inventors: Ye Hoon Lee, Seoul (KR); Yang Bae Park, Seogwipo-si (KR); Dong Young Lee, Seoul (KR); Hee Jeong Jeong, Seoul (KR); Dong Ho Kim, Seoul (KR); Bong-Seok Seo, Uijeongbu-si (KR); Seok Ju Byun, Seoul (KR); Ji Hyeon Yoo, Seoul (KR); Ye Bin Kim, Seoul (KR)

(73) Assignee: Foundation for Research and Business, Seoul National University of Science and Technology, Seoul (KR)

( * ) Notice: Subject to any disclaimer, the term of this patent is extended or adjusted under 35 U.S.C. 154(b) by 335 days.

(21) Appl. No.: 18/255,799

(22) PCT Filed: Nov. 19, 2021

(86) PCT No.: PCT/KR2021/017079
§ 371 (c)(1),
(2) Date: Jun. 2, 2023

(87) PCT Pub. No.: WO2022/124625
PCT Pub. Date: Jun. 16, 2022

(65) Prior Publication Data
US 2024/0004025 A1    Jan. 4, 2024

(30) Foreign Application Priority Data

Dec. 8, 2020  (KR) .................. 10-2020-0170401
Aug. 26, 2021 (KR) .................. 10-2021-0113433

(51) Int. Cl.
*G01S 5/14*    (2006.01)
*H04W 64/00*   (2009.01)

(52) U.S. Cl.
CPC ............. *G01S 5/145* (2013.01); *H04W 64/00* (2013.01)

(58) Field of Classification Search
CPC .......... G01S 11/06; G01S 5/0252; G01S 5/12; G01S 1/68; G01S 2205/02; G01S 5/14;
(Continued)

(56) References Cited

U.S. PATENT DOCUMENTS 7,395,073 B2 *  7/2008  Gwon .................. G01S 5/0252
                                                        455/456.2
2008/0231511 A1  9/2008  Montuno
(Continued)

FOREIGN PATENT DOCUMENTS

CN      108896958 A     11/2018
KR      10-1374589 B1   3/2014
(Continued)

OTHER PUBLICATIONS

Dong Yeop Na et al., Measurement Based Visualization Method of Radio Wave Environment Using a Mode Seeking Algorithm, The Journal of Korean Institute of Electromagnetic Engineering and Science. Mar. 2014; 25(3), 296~303.

*Primary Examiner* — Olumide Ajibade Akonai
(74) *Attorney, Agent, or Firm* — You & IP, LLC (57) ABSTRACT

The present technology provides a system and a method for terminal positioning. According to a specific embodiment of the present invention, the position of a terminal is estimated using inner and outer centers obtained through points on each distance circumference generated on the basis of the RSSI of each indoor positioning sensor, a terminal correction position is derived: using an estimated terminal position (Continued)

derived using each distance value generated on the basis of the RSSI of each indoor positioning sensor, and the intersection points between straight lines connecting a circle with the smallest radius determined with the RSSI, the remaining two circles that excludes the circle with the smallest radius, and the estimated terminal position; and on the basis of the circular arc of the smallest circle, including the intersection points, and the ratio of the radii of the remaining two circles that excludes the smallest circle determined with the RSSI, and the estimated terminal position is corrected using the derived terminal correction position so that the accuracy of terminal position can be fundamentally improved.

16 Claims, 10 Drawing Sheets

(58) Field of Classification Search
CPC ...... G01S 5/0205; G01S 5/145; H04W 64/00; H04W 4/33; H04W 4/025; H04W 64/003; H04W 5/0268; H04W 5/0249; G01C 21/206

See application file for complete search history.

(56) References Cited

U.S. PATENT DOCUMENTS

| | | | |
|---|---|---|---|
| 2012/0258732 A1* | 10/2012 | Jeong | H04L 12/1432 455/456.1 |
| 2020/0084366 A1* | 3/2020 | Fujiwara | H04R 3/005 |
| 2020/0124466 A1* | 4/2020 | Lubas | G01J 1/0228 |
| 2020/0209345 A1* | 7/2020 | Hwang | G01S 5/00 |

FOREIGN PATENT DOCUMENTS

| | | |
|---|---|---|
| KR | 10-1515013 B1 | 4/2015 |
| KR | 10-1709411 B1 | 2/2017 |
| KR | 10-2019-0084405 A | 7/2019 |
| KR | 10-2021-0017303 A | 2/2021 |
| WO | 2012138182 A2 | 10/2012 |

* cited by examiner

SYSTEM AND METHOD FOR TERMINAL POSITIONING

TECHNICAL FIELD

The present disclosure relates to a system and a method for terminal positioning. More particularly, the present disclosure relates to a technology in which a position of a terminal is estimated using circumcenters and an incenter with respect to distance circumferences, which are based on received signal strength indicators (RSSIs) received from at least three indoor positioning sensors, from the terminal to each of the indoor positioning sensors and the terminal position is corrected to be close to an actual measurement position, thereby fundamentally increasing the accuracy of a terminal position.

BACKGROUND ART

Many technologies and systems related to terminal position information have been developed and researched recently, and many studies have been made to provide a ubiquitous environment in which useful position-based services are provided through the technologies and systems. In order to have reliability and usefulness of position information, a system and a technology for determining a position of a user terminal are considered very important.

Conventional algorithms used for position recognition include an angle of arrival (AoA) position recognition algorithm for performing position recognition by measuring an angle of incidence of a received signal using a directional antenna, a received signal strength indicator (RSSI) position recognition algorithm for measuring a distance between a beacon and a terminal by using the RSSI, which changes with distance, and various methods such as a Global Positioning System (GPS) method that performs position recognition through communication with at least four artificial satellites including atomic clocks for calculating longitude, latitude, altitude coordinates, and time error, and tracks a position of a GPS receiver using the theory of "distance=speed of light*elapsed time" based on triangulation.

Herein, the GPS method is a technology limited to outdoors, and it is required to establish an indoor position recognition system using wireless transmitters capable of receiving indoors.

Accordingly, in the case of an indoor position recognition system based on an RSSI position recognition technology for deriving position information by using a triangulation algorithm based on RSSI values of received signals provided from beacons, an error rate of an estimated terminal position increases in terms of accuracy when circumferences (hereinafter, referred to as "distance circumferences"), at which RSSI values of received signals provided from beacons can be respectively received, do not meet, when only two distance circumferences meet, or when three distance circumferences do not meet at one point.

Thus, recently, research has been conducted on position correction algorithms for an estimated terminal position error due to multipath fading, surrounding interference signals, and so on.

However, there is a limitation that when an estimated terminal position is out of a valid indoor space, an error of the estimated position cannot be corrected.

Therefore, the applicant intends to propose a method of estimating a position of a terminal based on circumcenters and an incenter obtained using points on distance circumferences between the terminal and each sensor, and of correcting the estimated terminal position out of a valid indoor space so that the estimated terminal position is close to an actual measurement position.

DOCUMENT OF RELATED ART

Patent Document

Patent Document 1. Korean Patent No. 10-1515013 (INDOOR WIRELESS POSITIONING SYSTEM AND INDOOR WIRELESS POSITIONING METHOD)

DISCLOSURE

Technical Problem

The present disclosure is directed to providing a system and a method for terminal positioning, the system and the method being capable of fundamentally increasing the accuracy of a terminal position by estimating a position of a terminal using: circumcenters of three triangles obtained through points on distance circumferences of received signals provided from respective indoor positioning sensors; and the incenter of one triangle formed by the circumcenters.

Thus, the present disclosure is capable of terminal position estimation even when distance circumferences of received signals provided from respective indoor positioning sensors do not meet, or when only two distance circumferences meet, or when three distance circumferences do not meet at one point, and is capable of reducing the operation complexity and the operation time of a terminal position recognition algorithm, and is applicable to lightweight devices.

The present disclosure is directed to providing a system and a method for terminal positioning, the system and the method being capable of fundamentally increasing the accuracy of a terminal position resulting from indoor positioning, by deriving a corrected terminal position close to an actual measurement position with respect to an estimated terminal position out of a valid indoor space.

Accordingly, the present disclosure is capable of reducing the operation complexity and the operation time of a correction algorithm for correcting a terminal position error and is thus applicable to lightweight devices.

The objectives of the present disclosure are not limited thereto, and the other objectives and advantages of the present disclosure which are not described will be understood from the following description and become apparent by the embodiments of the present disclosure. In addition, it is understood that the objectives and advantages of the present disclosure may be implemented by components defined in the appended claims or their combinations.

Technical Solution

According to an embodiment of the present disclosure, there is provided a system for terminal positioning,
  the system generating an estimated terminal position by using distances generated based on RSSIs received from multiple indoor positioning sensors and the system including:
  a terminal position estimation device for estimating the position of a terminal based on circumcenters and an incenter obtained using points on distance circumferences between the terminal and each of the indoor positioning sensors, wherein the distance circumferences are generated based on the RSSIs (received signal strength indicators).

Preferably, the terminal position estimation device includes:
- a distance circumference generation part for selecting, among the multiple indoor positioning sensors, three indoor positioning sensors having relatively great RSSI values and setting the distance circumferences of the respective indoor positioning sensors based on RSSI signals of the respective sensors;
- a circumcenter derivation part for determining the points on the distance circumferences as vertexes to generate multiple circumcenter triangles and deriving the circumcenters of the respective circumcenter triangles; and
- an incenter derivation part for generating one incenter triangle that connects the circumcenters of the multiple circumcenter triangles and estimating that the incenter of the generated one incenter triangle is the position of the terminal.

Preferably, the number of the circumcenter triangles is three, and
- each of the multiple circumcenter triangles is
- generated using, as the vertexes, two intersection points on the distance circumferences with respect to a straight line connecting the indoor positioning sensors, and the point on the remaining distance circumference except the used two distance circumferences.

Preferably, the circumcenters of the circumcenter triangles are derived as intersection points of perpendicular bisectors for the respective circumcenter triangles.

Preferably, the incenter of the incenter triangle is derived as an intersection point of bisectors of three angles of the incenter triangle.

Preferably, the system for terminal positioning
- further includes a terminal correction device for correcting the estimated terminal position that is out of a valid indoor space set based on the multiple indoor positioning sensors.

Preferably, the terminal correction device includes:
- a control module for determining whether the estimated terminal position is in a valid indoor area determined based on the multiple indoor positioning sensors;
- an intersection point acquisition module for acquiring, when the control module determines that the estimated terminal position is out of the valid indoor area, an intersection point between the estimated terminal position and a circle with a smallest radius generated based on the greatest RSSI among circles respectively generated based on the RSSIs of the multiple indoor positioning sensors; and
- a correction module for determining, when the number of the intersection points is two, a corrected terminal position based on: an interior angle formed by the intersection points and a center of the circle with the smallest radius generated based on the greatest RSSI; a ratio between radii of the remaining circles except the circle with the smallest radius generated based on the greatest RSSI; and a circular arc generated by the intersection points on a circumference of the circle with the smallest radius generated based on the greatest RSSI.

Preferably, the intersection point acquisition module is configured to
- generate straight lines XE and XG connecting the estimated terminal position X respectively to centers E and G of the remaining two circles B and C except the circle A with the smallest radius generated based on the greatest RSSI among the circles A, B, and C respectively generated based on the RSSIs of the multiple indoor positioning sensors, and
- generate the intersection points $U_B$ and $U_C$ on the circumference of the circle A with respect to the generated straight lines XE and XG, respectively.

Preferably, the correction module is configured to
- divide, when the number of the intersection points of the intersection point acquisition module is two, the interior angle $\angle A$ formed by the intersection points $U_B$ and $U_C$ and the center of the circle A in the ratio between the radii of the remaining two circles B and C to derive an angle $\angle B$ and an angle $\angle C$, and
- set, as the corrected terminal position, an intersection point P at which the derived angles $\angle B$ and $\angle C$, the center H of the circle A, and the circular arc generated by the intersection points $U_B$ and $U_C$ on the circumference of the circle A meet.

Preferably, the correction module is configured to
- set the corrected terminal position based on a length of the circular arc of the circle A defined by the intersection points $U_B$ and $U_C$ and the ratio between the radii of the remaining two circles B and C when the number of the intersection points of the intersection point acquisition module is two.

Preferably, the correction module is configured to
- divide the length of the circular arc of the circle A determined by the intersection points $U_B$ and $U_C$ in the ratio between the radii of the two circles B and C, and then set a position on the circumference of the divided circle A as the corrected terminal position.

Preferably, the intersection point acquisition module is configured to
- derive, when the number of the acquired intersection points is one or fewer, intersection points $U_B'$ and $U_C'$ on a circumference of the circle A' generated based on the RSSI with respect to straight lines M and N of the valid indoor area based on the indoor positioning sensor with the smallest received signal among the valid indoor areas set based on the multiple indoor positioning sensors, and
- the correction module is configured to
- divide an interior angle $\angle A'$ formed by the derived intersection points $U_B'$ and $U_C'$ and a center of the circle A' in a ratio between radii of the remaining two circles B' and C' determined based on the RSSIs to derive an angle $\angle B'$ and an angle $\angle C'$, and
- determine, as the corrected terminal position, an intersection point P' at which the derived angles $\angle B'$ and $\angle C'$, the center of the circle A', and a circular arc of the circle A' generated by the intersection points $U_B'$ and $U_C'$ meet.

Preferably, the intersection point acquisition module is configured to
- derive, when the number of the acquired intersection points is one or fewer, intersection points $U_B'$ and $U_C'$ on a circumference of the circle A' generated based on the RSSI with respect to straight lines M and N of the valid indoor area based on the indoor positioning sensor with the smallest received signal among the valid indoor areas set based on the multiple indoor positioning sensors, and
- the correction module is configured to
- set, as the corrected terminal position, a position on a circular arc obtained by dividing a length of the circular arc of the circle A' defined by the intersection points $U_B'$ and $U_C'$ in a ratio between radii of the two circles B' and C'.

According to another embodiment of the present disclosure, there is provided a method for terminal positioning, the method including:

generating distance circumferences respectively based on RSSIs of multiple indoor positioning sensors;

setting points on the distance circumferences and connects the points to generate multiple circumcenter triangles; and deriving circumcenters of the respective multiple circumcenter triangles and connecting the derived circumcenters to generate one incenter triangle, and estimating that an incenter of the generated incenter triangle is a position of a terminal.

Preferably, the circumcenters of the circumcenter triangles are respectively derived as intersection points of perpendicular bisectors of sides of the circumcenter triangles.

Preferably, the incenter of the incenter triangle is derived as an intersection point of bisectors of three angles of the incenter triangle.

Advantageous Effects

According to these features, a terminal position is estimated using the circumcenters and the incenter obtained through the points on the distance circumferences respectively generated based on the RSSIs of the indoor positioning sensors, thereby fundamentally increasing the accuracy of a terminal position.

In addition, according to these features, a process of performing terminal position correction is omitted from an existing position recognition algorithm using a triangulation technique when the distance circumferences do not meet, when only two distance circumferences meet, or when three distance circumferences do not meet at one point, so that the operation complexity and the operation time of a terminal position recognition algorithm can be reduced and the present disclosure is thus applicable to lightweight devices.

In addition, by using an estimated terminal position derived using access points respectively generated based on the RSSIs of the indoor positioning sensors and by using intersection points between the circle with the smallest radius determined based on the RSSIs and straight lines connecting the estimated terminal position to the remaining two circles except the circle with the smallest radius, a corrected terminal position is derived based on the circular arc of the smallest circle formed by the intersection points and the ratio between the radii of the remaining two circles except the smallest circle determined based on the RSSIs, thereby fundamentally increasing the accuracy of a terminal position.

In addition, according to these features, a process of performing terminal position correction is omitted from an existing position recognition algorithm using a triangulation technique, so that the operation complexity and the operation time of a terminal position recognition algorithm can be reduced and the present disclosure is thus applicable to lightweight devices.

DESCRIPTION OF DRAWINGS

The accompanying drawings illustrate preferred embodiments of the present disclosure and together with the following disclosure, serve to provide further understanding of the technical features of the present disclosure, and thus, the present disclosure is not to be construed as being limited to the drawing, in which.

BEST MODE

Hereinafter, embodiments of the present disclosure will be described in detail with reference to the drawings.

The present disclosure and method of accomplishing the same may be understood more readily by reference to the following detailed description of embodiments and the accompanying drawings. However, the present disclosure may be embodied in many different forms, and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

The terminology used herein will be described briefly, and the embodiments of the present disclosure will be described in detail.

The terminology used herein is defined considering the function of corresponding components used in the present disclosure and may be varied according to users, operator's intention, or practices. In addition, an arbitrary defined terminology may be used in a specific case and will be described in detail in a corresponding description paragraph. Therefore, the terminology used herein is for the purpose of describing particular embodiments only and is not intended to be limiting of the disclosure.

Throughout the specification, when a part "includes" an element, it is noted that it further includes other elements, but does not exclude other elements, unless specifically stated otherwise. Further, the term "unit" used in the specification means a software component or hardware component such as an FPGA or an ASIC, and performs a specific function. However, the term "unit" is not limited to software or hardware. The term "unit" may be formed so as to be in an addressable storage medium, or may be formed so as to operate one or more processors.

Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, and variables. A function provided by the components and "units" may be associated with the smaller number of components and "units", or may be divided into additional components and "units".

Prior to the description of the present disclosure, some terms used herein will be clarified.

Hereinbelow, embodiments of the present disclosure will be described in detail with reference to the accompanying drawings such that the present disclosure can be easily embodied by those skilled in the art to which this present disclosure belongs. In the drawings, parts irrelevant to the description are omitted to clearly describe the present disclosure.

Figure 1:
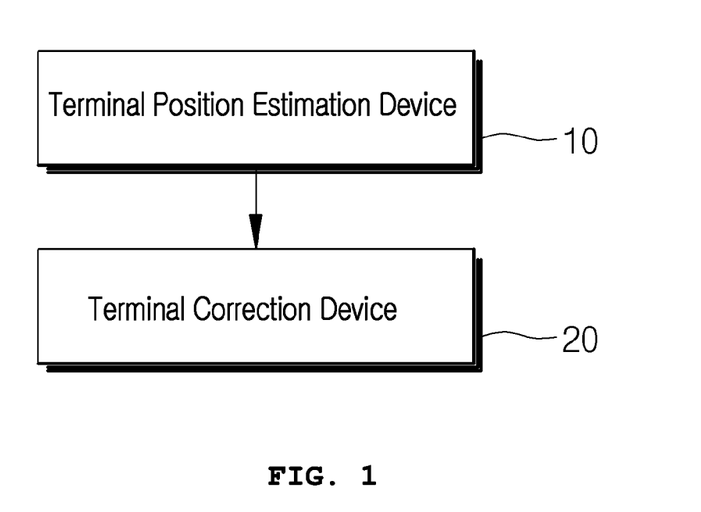
FIG. 1 is a diagram illustrating an overall configuration of a system for terminal positioning according to an embodiment.
Figure 2:
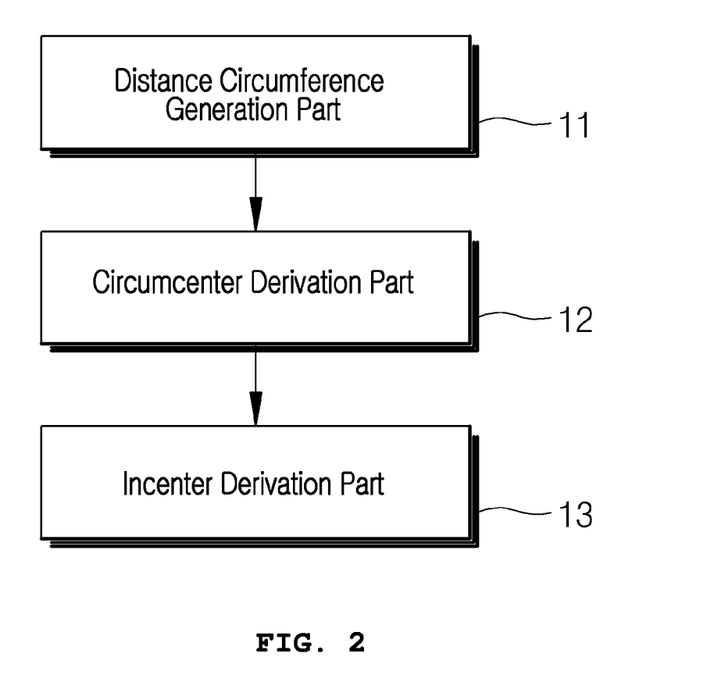
FIG. 2 is a diagram illustrating a detailed configuration of a terminal position estimation device according to an embodiment.
Figure 3:
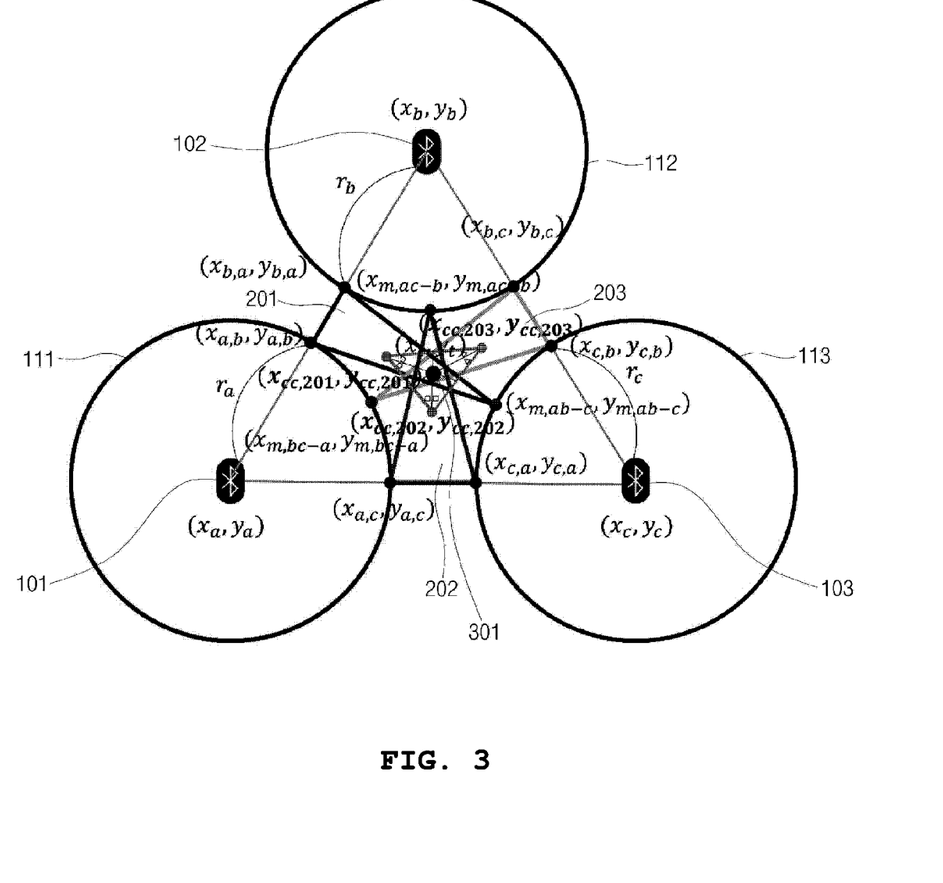
FIG. 3 is a diagram illustrating the concept of circumcenter triangles and an incenter triangle in a terminal position estimation device according to an embodiment.
Figure 4:
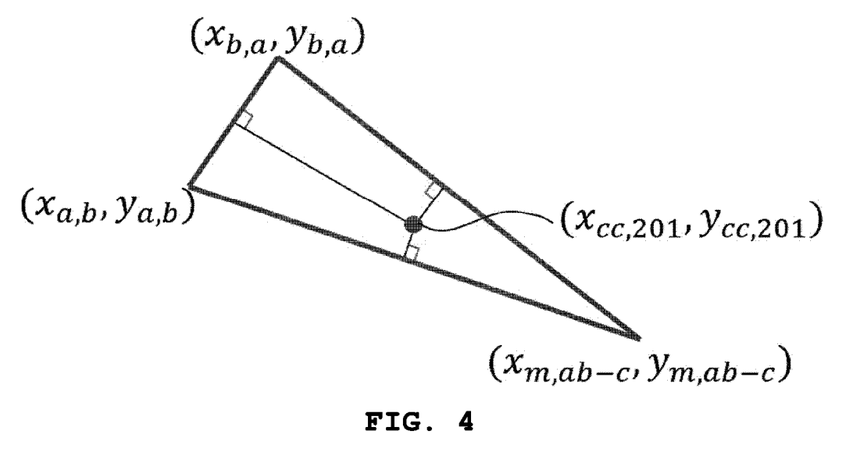
FIG. 4 is a diagram illustrating the concept of deriving a circumcenter of a circumcenter triangle by a terminal position estimation device according to an embodiment.
Figure 5:
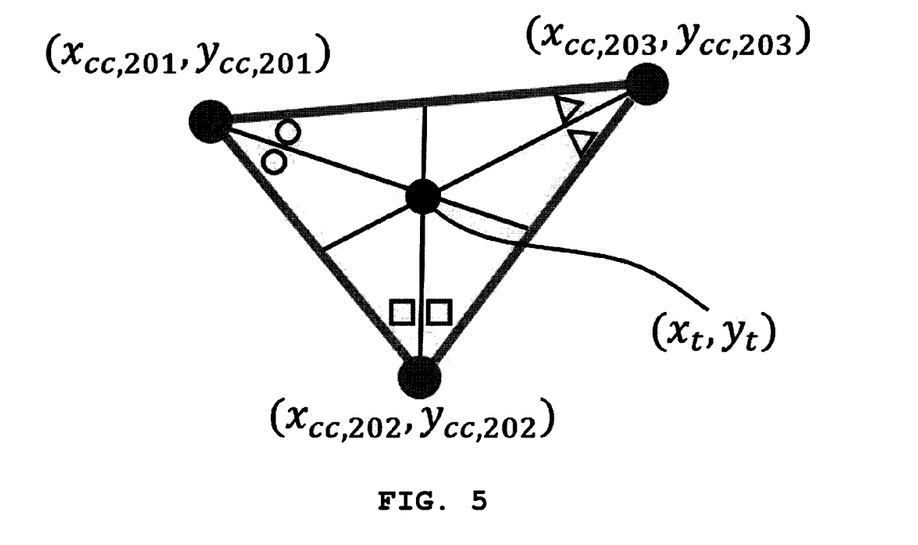
FIG. 5 is a diagram illustrating the concept of deriving an incenter of an incenter triangle by a terminal position estimation device according to an embodiment.

FIG. 1 is a diagram illustrating an overall configuration of a system for terminal positioning according to an embodiment. FIG. 2 is a diagram illustrating a configuration of a terminal position estimation device of FIG. 1. FIG. 3 is a diagram illustrating circumcenter triangles and an incenter triangle generated based on distance circumferences of FIG. 2. FIG. 4 is a diagram illustrating the concept of generating a circumcenter of a circumcenter triangle of FIG. 3. FIG. 5 is a diagram illustrating the concept of generating an incenter based on an incenter triangle shown in FIG. 4.

Referring to FIGS. 1 to 5, a system for terminal positioning according to an embodiment may include a terminal position estimation device 10 and a terminal correction device 20.

Herein, the terminal position estimation device 10 is configured to estimate a position of a terminal by using circumcenter triangles based on points on distance circumferences respectively generated based on RSSI signals of indoor positioning sensors and by using an incenter of an incenter triangle with vertexes that are the circumcenters of the three circumcenter triangles. The terminal position estimation device may include a distance circumference generation part 11, a circumcenter derivation part 12, and an incenter derivation part 13.

The distance circumference generation part 11 calculates and generates, based on received signal strength indicator (RSSI) signals received from multiple indoor positioning sensors 101, 102, and 103 that are installed indoors at predetermined locations, distance circumferences 111, 112, and 113 from a terminal to the indoor positioning sensors 101, 102, and 103, respectively.

For example, let's assume that three distance circumferences 111, 112, and 113 are generated for three indoor positioning sensors 101, 102, and 103, respectively, and the coordinates of the indoor positioning sensors 101, 102, and 103 are $(x_a, y_a)$, $(x_b, y_b)$, and $(x_c, y_c)$, respectively, and the distances between the indoor positioning sensors 101, 102, and 103 and the distance circumferences 111, 112, and 113 are $r_a$, $r_b$, and $r_c$, respectively. Herein, $r_a$, $r_b$, and $r_c$ may be obtained by various ways. For example, distances $r_a$, $r_b$, and $r_c$ may be derived using the RSSIs received from the indoor positioning sensors 101, 102, and 103.

In addition, the circumcenter derivation part 12 connects points on each of the distance circumferences 111, 112, and 113 to generate multiple circumcenter triangles 201, 202, and 203 and derives the circumcenters of the generated circumcenter triangles 201, 202, and 203.

Referring to FIG. 3, the circumcenter triangle 201 is generated by determining points $(x_{a,b}, y_{a,b})$ and $(x_{b,a}, y_{b,a})$, at which a straight line connecting two indoor positioning sensors 101 and 102 and the distance circumferences 111 and 112 meet, as two vertexes and determining a point $(x_{m,ab-c}, y_{m,ab-c})$, at which a straight line connecting the midpoint between the vertexes $(x_{b,a}, y_{b,a})$ and $(x_{a,b}, y_{a,b})$ with the indoor positioning sensor 103 and the distance circumference 113 meet, as the remaining vertex.

In addition, the circumcenter triangle 202 is generated by determining points $(x_{a,c}, y_{a,c})$ and $(x_{c,a}, y_{c,a})$, at which a straight line connecting two indoor positioning sensors 101 and 103 and the distance circumferences 111 and 113 meet, as two vertexes and determining a point $(x_{m,ac-b}, y_{m,ac-b})$, at which a straight line connecting the midpoint between the vertexes $(x_{a,c}, y_{a,c})$ and $(x_{c,a}, y_{c,a})$ with the indoor positioning sensor 102 and the distance circumference 112 meet, as the remaining vertex.

In addition, the circumcenter triangle 203 is generated by determining points $(x_{b,c}, y_{b,c})$ and $(x_{c,b}, y_{c,b})$, at which a straight line connecting two indoor positioning sensors 102 and 103 and the distance circumferences 112 and 113 meet, as two vertexes and determining a point $(x_{m,bc-a}, y_{m,bc-a})$, at which a straight line connecting the midpoint between the vertexes $(x_{b,c}, y_{b,c})$ and $(x_{c,b}, y_{c,b})$ with the indoor positioning sensor 101 and the distance circumference 111 meet, as the remaining vertex.

Referring to FIG. 4, the circumcenters of the circumcenter triangles 201, 202, and 203 are set as intersection points of perpendicular bisectors of sides of the circumcenter triangles 201, 202, and 203. Herein, the coordinates of the circumcenters of the respective circumcenter triangles 201, 202, and 203 are $(x_{cc,201}, y_{cc,201})$, $(x_{cc,202}, y_{cc,202})$, and $(x_{cc,203}, y_{cc,203})$.

For example, the circumcenter $(x_{cc,201}, y_{cc,201})$ of the circumcenter triangle 201 is derived based on a straight line passing through the center point $(x_c, y_c)$ for the distance circumference 113 and the midpoint $(x_{m,ab}, y_{m,ab})$ between the two vertexes $(x_{ba}, y_{ba})$ and $(x_{ab}, y_{ab})$ of the circumcenter triangle 201, and the equation of the circle for the distance circumference 113.

That is, the straight line passing through the center point $(x_c, y_c)$ for the distance circumference 113 and the midpoint $(x_{m,ab}, y_{m,ab})$ between the two vertexes $(x_{ba}, y_{ba})$ and $(x_{ab}, y_{ab})$ of the circumcenter triangle 201 may be expressed as Equation 1.

$$y = \frac{y_c - y_{m,ab}}{x_c - x_{m,ab}} x - \frac{y_c - y_{m,ab}}{x_c - x_{m,ab}} x_{m,ab} + y_{m,ab} \qquad \text{[Equation 1]}$$

In addition, the equation of the circle for the distance circumference 113 may be expressed as Equation 2.

$$(x-x_c)^2 + (y-y_c)^2 = r_c^2 \qquad \text{[Equation 2]}$$

In addition, the incenter derivation part 300 determines the circumcenters of the respective circumcenter triangles 201, 202, and 203 as vertexes and connects the vertexes to generate one incenter triangle 301, and estimates that the incenter $(x_t, y_t)$ of the generated incenter triangle 301 is the position of the terminal.

Referring to FIG. 5, the incenter $(x_t, y_t)$ of the incenter triangle 301 may be derived as the intersection point of bisectors of the three angles of the incenter triangle.

Figure 6:
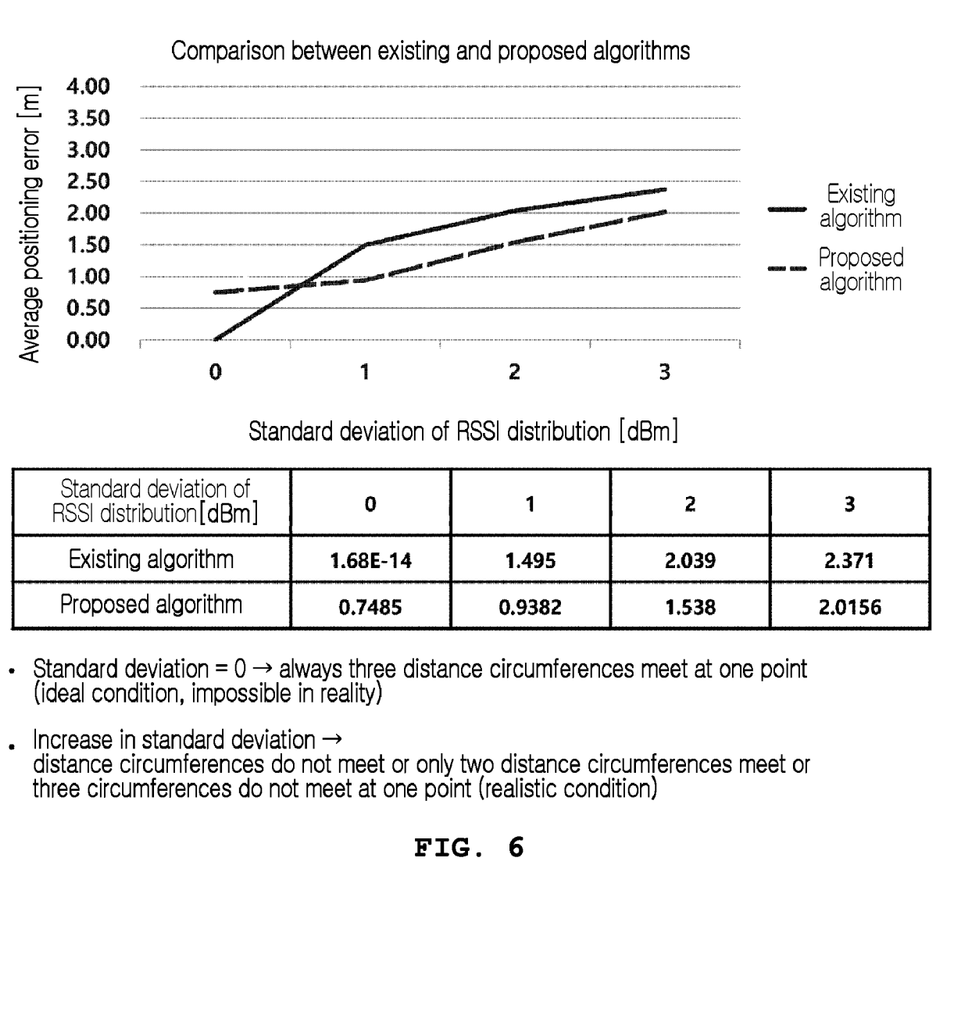
FIG. 6 is a diagram illustrating an example of a terminal position recognition error of a terminal position estimation device according to an embodiment.

FIG. 6 is a graph illustrating a terminal position estimation error according to an embodiment. Referring to FIG. 5, it was found that compared to an existing position recognition algorithm using a triangulation technique, a terminal position estimation algorithm according to an embodiment reduces a terminal position estimation error by 36.7%.

According to an embodiment, a position of a terminal is estimated by using: circumcenters obtained using points on distance circumferences respectively generated based on the RSSIs of indoor positioning sensors; and an incenter of a triangle with vertexes that are the circumcenters, thereby fundamentally increasing the accuracy of a terminal position. In addition, from the existing position recognition algorithm using a triangulation technique, a process of performing terminal position correction is omitted when distance circumferences do not meet, when only two distance circumferences meet, or when three distance circumferences do not meet at one point, so that the operation complexity and the operation time of a terminal position recognition algorithm can be reduced and the present disclosure is thus applicable to lightweight devices.

Figure 7:
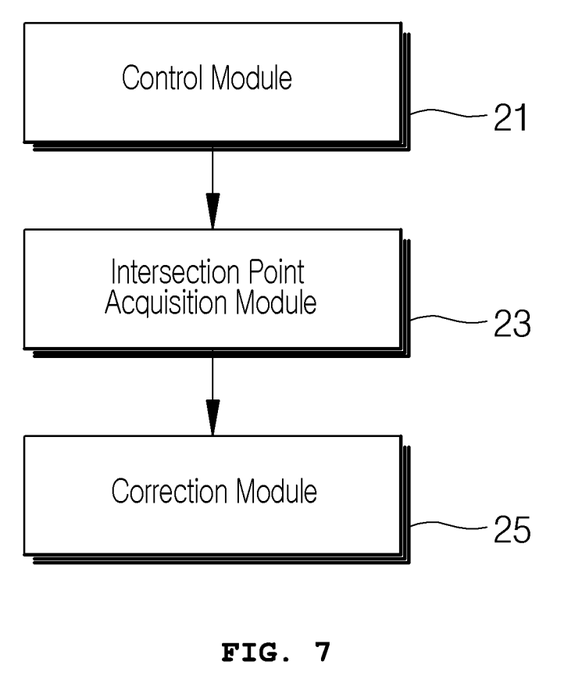
FIG. 7 is a diagram illustrating a detailed configuration of a terminal correction device of a system according to an embodiment.
Figure 8:
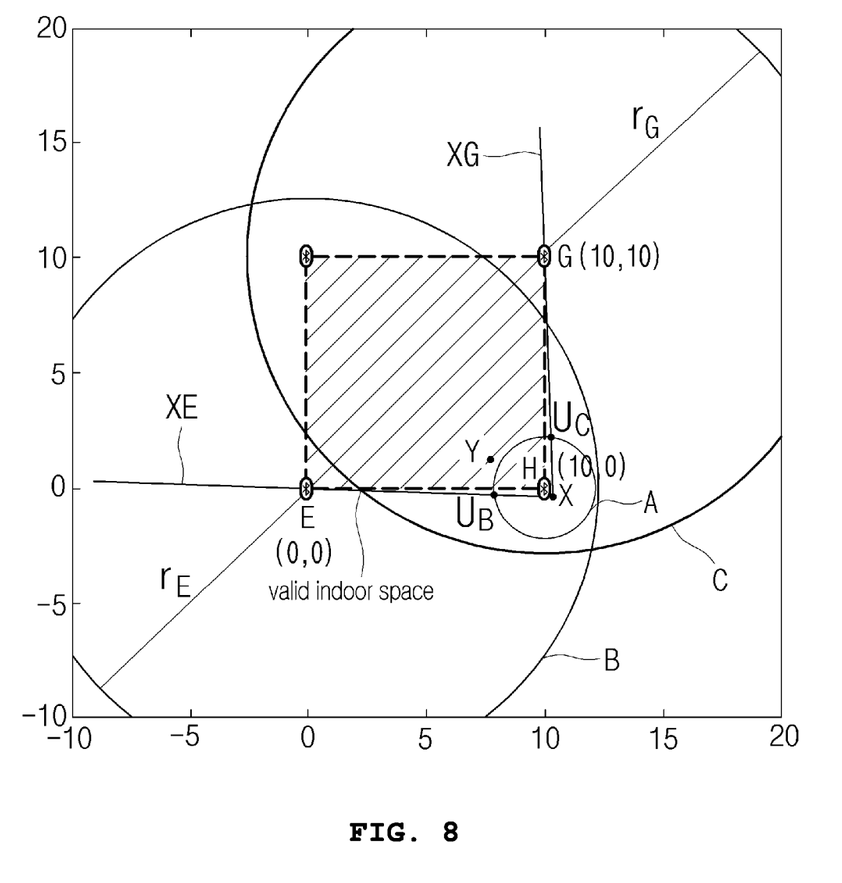
FIG. 8 is a diagram illustrating an example of an intersection point derivation process of a terminal correction device according to an embodiment.
Figure 9:
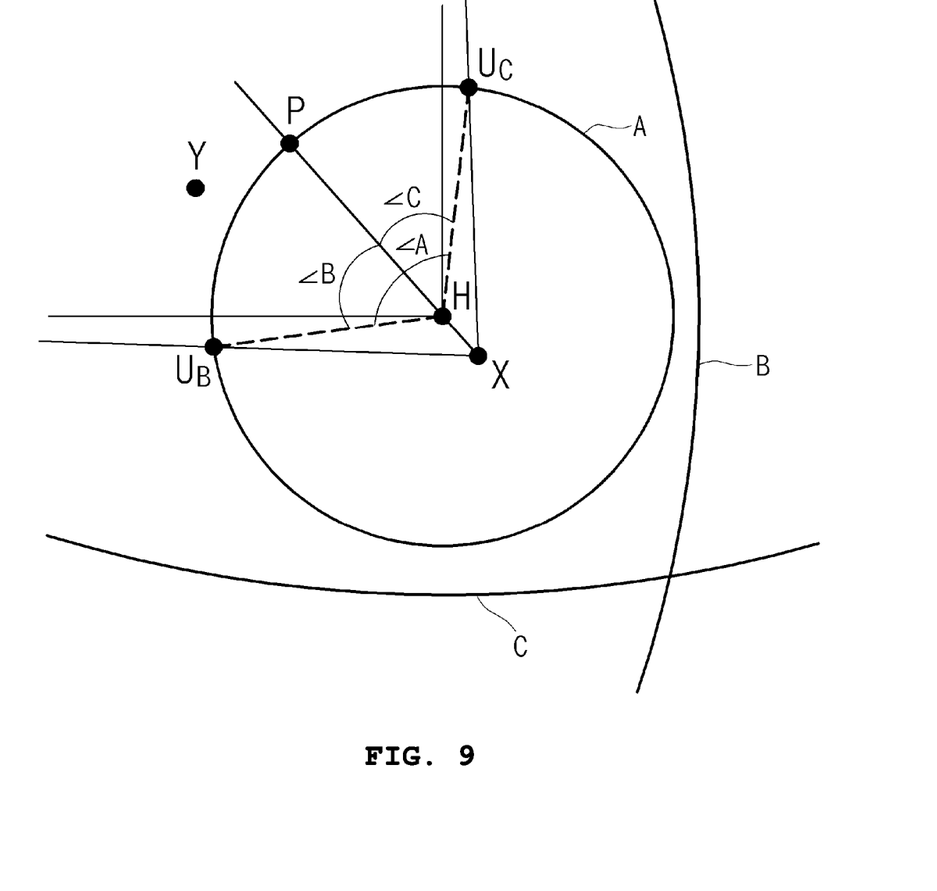
FIG. 9 is a diagram illustrating an example of a process of setting a corrected terminal position using an intersection point of FIG. 8.

FIG. 7 is a diagram illustrating a detailed configuration of the position correction device 20 of FIG. 1. FIG. 8 is a diagram illustrating the concept of an intersection point between a circle with the smallest RSSI of FIG. 7 and an estimated terminal position. FIG. 9 is a diagram illustrating the concept of a process of setting a corrected terminal position from the intersection point of FIG. 8.

Referring to FIGS. 7 to 9, the position correction device 20 may be configured to correct an estimated terminal position, which is estimated using distance values respectively generated based on the RSSIs of the indoor positioning sensors, to a corrected terminal position close to an actual measurement position.

The position correction device 20 includes a configuration for correcting an estimated terminal position obtained by the terminal position estimation device 10 to a corrected terminal position close to an actual measurement position when the estimated terminal position is out of a valid measurement space. As shown in FIG. 7, the position correction device 20 may include at least one of the following: a control module 21, an intersection point acquisition module 23, and a correction module 25.

Herein, the control module 21 determines whether an estimated terminal position obtained by the terminal position estimation device 10 is out of a valid measurement area. Herein, a valid indoor area refers to an indoor space in which the multiple indoor positioning sensors are installed, and when an estimated terminal position is out of the valid indoor area in which the multiple indoor positioning sensors are installed, the estimated terminal position has a negative value and correction is thus performed on the estimated terminal position.

In order to correct an error between an estimated terminal position and an actual measurement position, the intersection point acquisition module 23 acquires an intersection point between an estimated terminal position X obtained by the terminal position estimation device 10 and a circle A with the smallest radius generated based on the greatest RSSI among circles generated based on the RSSIs of the multiple indoor positioning sensors. Herein, the radius of each circle is set to a value that is inversely proportional to the RSSI.

Hereinafter, with reference to FIGS. 8 and 9, a process of acquiring intersection points $U_B$ and $U_C$ between an estimated terminal position X and the circle A with the smallest radius for the greatest RSSI among the circles A, B, and C generated based on the RSSIs of multiple indoor positioning sensors a, b, and c, and then determining a corrected terminal position based on the acquired intersection points $U_B$ and $U_C$ will be described in detail.

Referring to FIG. 8, the intersection point acquisition module 23 acquires the center H of the circle A of the indoor positioning sensor a with the greatest RSSI among the multiple indoor positioning sensors a, b, and c, and acquires the center E of the circle B and the center G of the circle C determined based on the RSSIs of the indoor positioning sensors b and c nearby the indoor positioning sensor a.

In addition, the intersection point acquisition module 23 derives straight lines XE and XG with respect to the estimated terminal position X and the acquired center E of the circle B and the acquired center G of the circle C, and acquires the intersection points $U_B$ and $U_C$ on the circumference of the circle A with respect to the derived straight lines XE and XG, respectively, and transmits positions of the acquired intersection points $U_B$ and $U_C$ to the correction module 250.

Referring to FIG. 9, for example, the correction module 25 divides an interior angle ∠A, which is formed by the intersection points $U_B$ and $U_C$ and the center H of the circle A, in a ratio $(r_E:r_G)$ between the radius of the circle B and the radius of the circle C so as to derive an angle ∠B and an angle ∠C, and derives an intersection point P on a circular arc of the circle A generated by the intersection points $U_B$ and $U_C$ with respect to the angle ∠B and the angle ∠C as a corrected terminal position.

With the center H (10, 0) of the circle A, the center E(0, 0) of the circle B, the center G(10, 10) of the circle C, and an estimated terminal position X(10.36, −0.39), the correction module 250 derives a corrected terminal position P(8.33, 1.55). Therefore, while before correction, an error between an actual measurement position Y(7.71, 1.22) and the estimated terminal position X(10.36, −0.39) is 3.1 m, an error between the actual measurement position Y(7.71, 1.22) and the corrected terminal position P(8.33, 1.55) is m. Accordingly, it is found that compared to the estimated terminal position X, the corrected terminal position P is close to the actual measurement position Y.

As another example, the correction module 25 divides the length of the circular arc of the circle A generated by the intersection points $U_B$ and $U_C$ in the ratio $(r_E:r_G)$ between the radius of the circle B and the radius of the circle C and derives the position P on the circumference of the divided circle A as a corrected terminal position.

Accordingly, an embodiment derives the accurate terminal position by determining the corrected terminal position close to the actual measurement position even though the estimated terminal position is out of the valid indoor area, thereby increasing the reliability of the indoor positioning system.

In the meantime, as the RSSI of the indoor positioning sensor a increases (that is, the radius decreases), the error between the estimated terminal position and the actual measurement position decreases and the number of intersection points becomes one or fewer.

Figure 10:
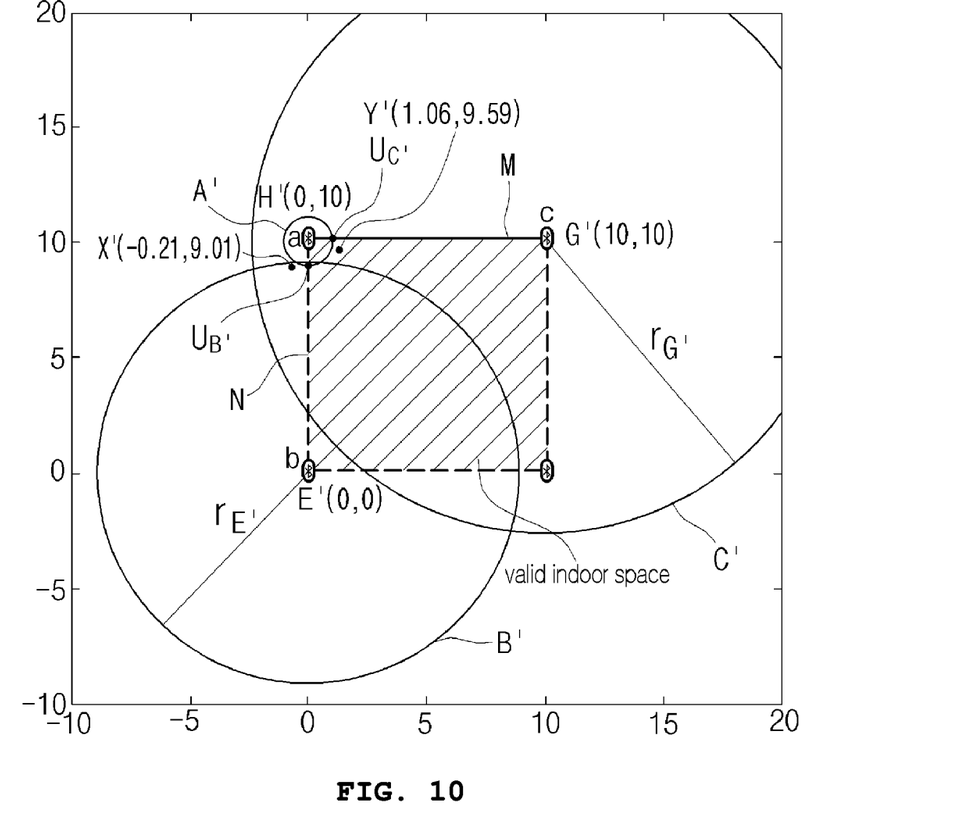
FIG. 10 is a diagram illustrating another example of an intersection point acquisition process of a terminal correction device according to an embodiment.
Figure 11:
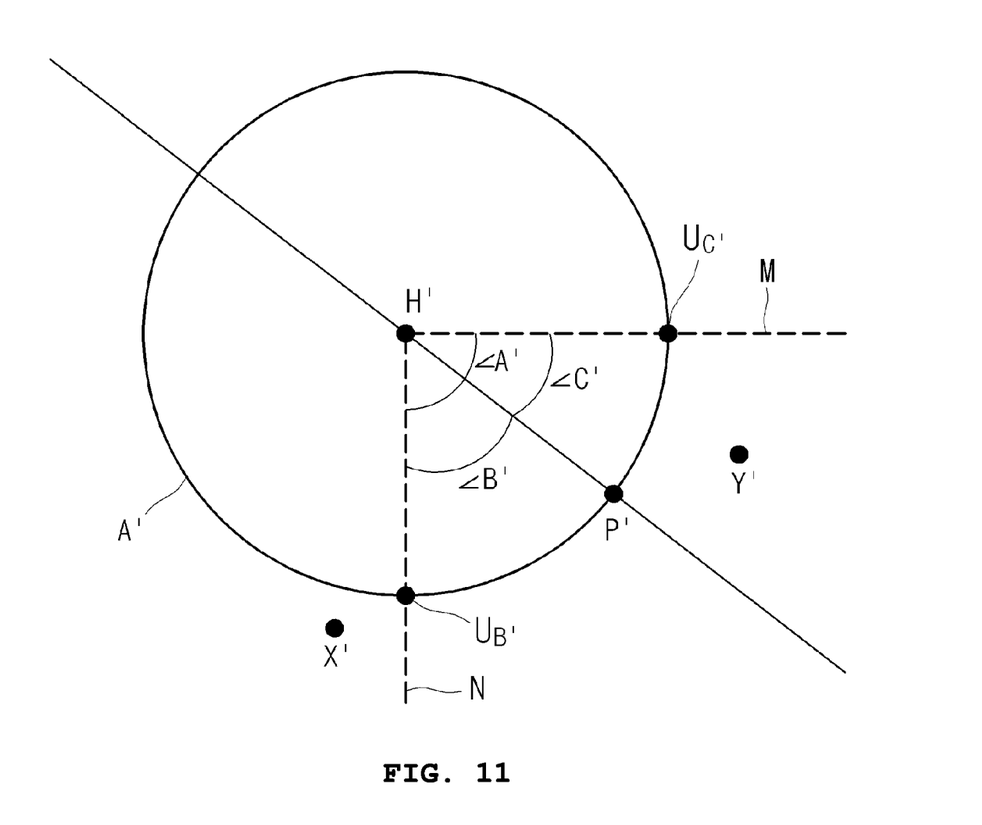
FIG. 11 is a diagram illustrating an example of a position setting process of a terminal correction device using an intersection point of FIG. 10.

Hereinafter, a series of processes for correcting an estimated terminal position out of a valid indoor space to a corrected terminal position close to an actual measurement position by the correction module 25 when there is one or no intersection point will be described with reference to FIGS. 10 and 11.

According to an embodiment, the intersection point acquisition module 23 acquires an intersection point between an estimated terminal position and a circle with the smallest radius generated based on the greatest RSSI among circles generated based on RSSIs of multiple indoor positioning sensors, and when one or no intersection point is acquired, the correction module 25 determines a corrected terminal position.

Referring to FIG. 5, the intersection point acquisition module 23 acquires the center H' of the circle A' determined with the greatest RSSI of the indoor positioning sensor a among the RSSIs of the multiple indoor positioning sensors a, b, and c, and acquires the center E' of the circle B' and the center G' of the circle C' determined with the RSSIs of the indoor positioning sensors b and c close to the indoor positioning sensor a.

In addition, the intersection point acquisition module 23 derives straight lines X'E' and X'G' with respect to an estimated terminal position X' and the acquired center E' of the circle B' and the acquired center G' of the circle C', and when there is one or no intersection point on the circumference of the circle A' with respect to the derived straight lines X'E' and X'G', the intersection point acquisition module 23 acquires intersection points $U_B'$ and $U_C'$ on the circumference of the circle A' with respect to a valid indoor space M, N set based on the indoor positioning sensor a and transmits the acquired intersection points $U_B'$ and $U_C'$ to the correction module 250.

For example, the correction module 25 obtains the intersection points $U_B'$ and $U_C'$ on the circumference of the circle A' with respect to the valid indoor space M, N set based on the indoor positioning sensor a and derives an interior angle ∠A' formed by the intersection points $U_B'$ and $U_C'$ and the center H of the circle A'.

In addition, the correction module 25 divides the derived interior angle ∠A' internally in a ratio ($r_E'$, $r_G'$) between the radii of the two circles B' and C', and determines an intersection point P' that meets a circular arc generated by the intersection points $U_B'$ and $U_C'$ on the circumference of the circle A' with respect to the angle ∠B' and the angle ∠C' as a corrected terminal position.

Accordingly, the corrected terminal position close to the actual measurement position is derived even though the estimated terminal position is out of the valid indoor area, thereby deriving the accurate terminal position and increasing the reliability of the indoor positioning system.

In addition, a process of performing terminal position correction is omitted from the existing position recognition algorithm using a triangulation technique, so that the operation complexity and the operation time of a terminal position recognition algorithm can be reduced and the present disclosure is thus applicable to lightweight devices.

Figure 12:
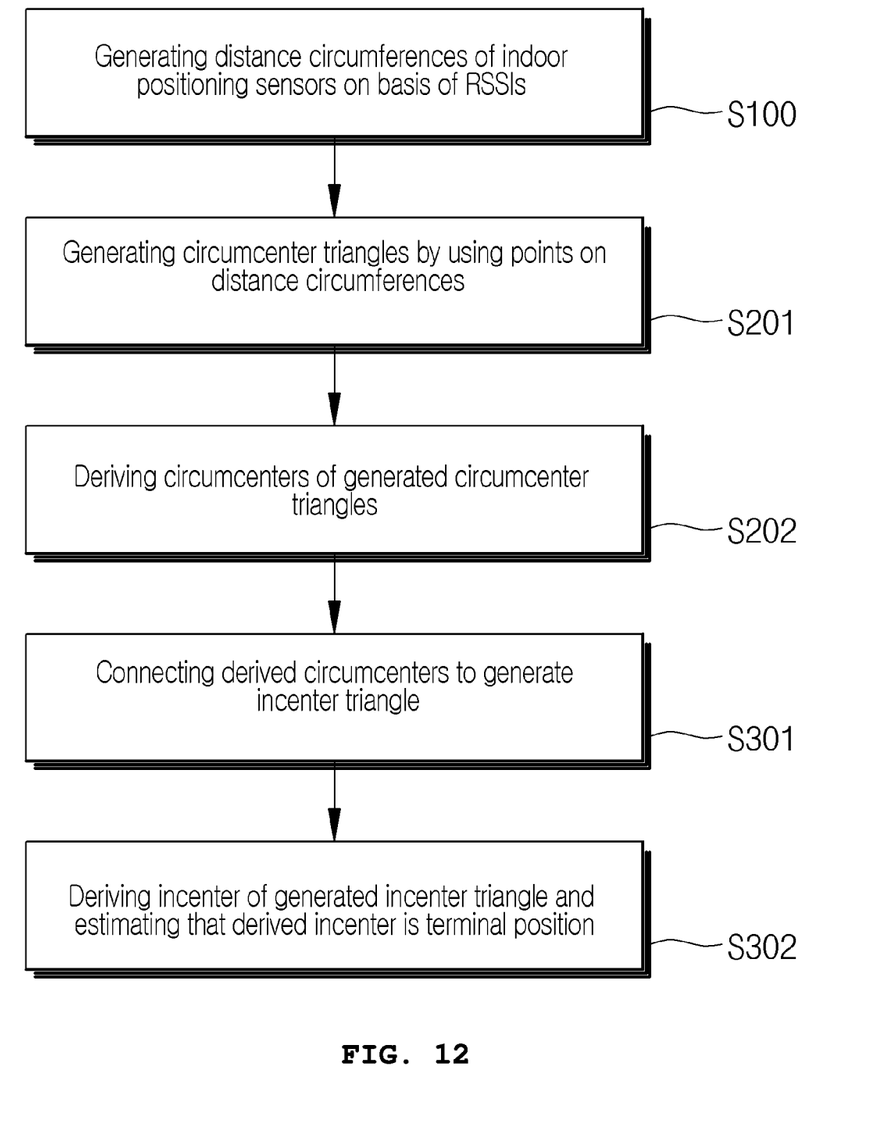
FIG. 12 is an overall flowchart illustrating a terminal positioning process according to another embodiment.

FIG. 12 is a flowchart illustrating an operation process of the terminal position estimation device shown in FIG. 1, and a terminal position recognition method of the present disclosure will be described with reference to FIG. 12.

First, in step S100, the distance circumference generation part 11 according to an embodiment generates, based on the RSSIs of the multiple indoor positioning sensors, distance circumferences between a terminal and each of the indoor positioning sensors. In steps S201 and S202, the circumcenter derivation part 12 according to an embodiment sets three points on each of the distance circumferences to generate circumcenter triangles and derives the circumcenter of each of the generated circumcenter triangles.

Afterward, in steps S301 and S302, the incenter derivation part 13 according to an embodiment connects the derived circumcenters to generate one incenter triangle, derives the incenter of the generated incenter triangle, and estimates that the derived incenter is the position of the terminal.

Herein, the circumcenters are respectively derived as intersection points of perpendicular bisectors of sides of the circumcenter triangles, and the incenter of the incenter triangle may be derived as the intersection point of bisectors of the three angles of the incenter triangle.

As another example, points on each of the distance circumferences are set and connected to generate three circumcenter triangles, and the incenter of each of the generated three circumcenter triangles is derived, and the derived incenters are connected to generate one incenter triangle, and it is estimated that the circumcenter of the one incenter triangle is the position of the terminal.

According to an embodiment, a position of a terminal is estimated using circumcenters and an incenter that are obtained through points on distance circumferences respectively generated based on the RSSIs of indoor positioning sensors, thereby fundamentally increasing the accuracy of a terminal position. In addition, from the existing position recognition algorithm using a triangulation technique, a process of performing terminal position correction is omitted when distance circumferences do not meet, when only two distance circumferences meet, or when three distance circumferences do not meet at one point, so that the operation complexity and the operation time of a terminal position recognition algorithm can be reduced and the present disclosure is thus applicable to lightweight devices.

Although the present disclosure has been described with reference to exemplary embodiments in conjunction with the drawings, it should be understood that these embodiments are given by way of illustration only and do not limit the scope of the disclosure, and that various modifications, variations, and alterations can be made by those skilled in the art. Accordingly, the scope of the present disclosure should be determined by the accompanying claims.

INDUSTRIAL APPLICABILITY

According to a system and a method for terminal positioning, a position of a terminal is estimated using circumcenters and an incenter that are obtained through points on distance circumferences respectively generated based on the RSSIs of indoor positioning sensors, thereby fundamentally increasing the accuracy of a terminal position. An estimated terminal position out of a valid indoor space is corrected to an actual measurement position, thereby fundamentally increasing the accuracy of a terminal position. In addition, a process of performing terminal position correction is omitted from an existing position recognition algorithm using a triangulation technique, so that the operation complexity and the operation time of a terminal position recognition algorithm can be reduced and the present disclosure is thus applicable to lightweight devices. Accordingly, it is possible to achieve significant progress in terms of accuracy and reliability of the operation of the system and the method for terminal positioning, and furthermore, performance efficiency. The indoor positioning system not only has sufficient possibility of commercialization or sales but can also be clearly implemented in practice. Therefore, the present disclosure is industrially applicable.

The invention claimed is:

1. A positioning system for a terminal for generating an estimated terminal position by using distances generated based on RSSIs received from multiple indoor positioning sensors, the system comprising:
    a terminal position estimation device for estimating the position of a terminal based on circumcenters and an incenter obtained using points on distance circumferences between the terminal and each of the indoor positioning sensors, wherein the distance circumferences are generated based on the RSSIs (received signal strength indicators).

2. The positioning system of claim 1, wherein the terminal position estimation device comprises:
    a distance circumference generation part for selecting, among the multiple indoor positioning sensors, three indoor positioning sensors having relatively great RSSI values and setting the distance circumferences of the respective indoor positioning sensors based on RSSI signals of the respective sensors;
    a circumcenter derivation part for determining the points on the distance circumferences as vertexes to generate multiple circumcenter triangles and deriving the circumcenters of the respective circumcenter triangles; and
    an incenter derivation part for generating one incenter triangle that connects the circumcenters of the multiple circumcenter triangles and estimating that the incenter of the generated one incenter triangle is the position of the terminal.

3. The positioning system of claim 2, wherein the number of the circumcenter triangles is three, and
    each of the multiple circumcenter triangles is generated using, as the vertexes, two intersection points on the distance circumferences with respect to a straight line connecting the indoor positioning sensors, and the point on the remaining distance circumference except the used two distance circumferences.

4. The positioning system of claim 2, wherein the circumcenters of the circumcenter triangles are derived as intersection points of perpendicular bisectors for the respective circumcenter triangles.

5. The positioning system of claim 2, wherein the incenter of the incenter triangle is derived as an intersection point of bisectors of three angles of the incenter triangle.

6. The positioning system of claim 1, further comprising:
    a terminal correction device for correcting the estimated terminal position that is out of a valid indoor space set based on the multiple indoor positioning sensors.

7. The positioning system of claim 6, wherein the terminal correction device comprises:
    a control module for determining whether the estimated terminal position is in a valid indoor area determined based on the multiple indoor positioning sensors;
    an intersection point acquisition module for acquiring, when the control module determines that the estimated terminal position is out of the valid indoor area, an intersection point between the estimated terminal position and a circle with a smallest radius generated based on the greatest RSSI among circles respectively generated based on the RSSIs of the multiple indoor positioning sensors; and
    a correction module for determining, when the number of the intersection points is two, a corrected terminal position based on: an interior angle formed by the intersection points and a center of the circle with the smallest radius generated based on the greatest RSSI; a ratio between radii of the remaining circles except the circle with the smallest radius generated based on the greatest RSSI; and a circular arc generated by the intersection points on a circumference of the circle with the smallest radius generated based on the greatest RSSI.

8. The positioning system of claim 7, wherein the intersection point acquisition module is configured to
    generate straight lines XE and XG connecting the estimated terminal position X respectively to centers E and G of the remaining two circles B and C except the circle A with the smallest radius generated based on the greatest RSSI among the circles A, B, and C respectively generated based on the RSSIs of the multiple indoor positioning sensors, and
    generate the intersection points $U_B$ and $U_C$ on the circumference of the circle A with respect to the generated straight lines XE and XG, respectively.

9. The positioning system of claim 8, wherein the correction module is configured to
    divide, when the number of the intersection points of the intersection point acquisition module is two, the interior angle $\angle A$ formed by the intersection points $U_B$ and $U_C$ and the center of the circle A in the ratio between the radii of the remaining two circles B and C to derive an angle $\angle B$ and an angle $\angle C$, and
    set, as the corrected terminal position, an intersection point P at which the derived angles $\angle B$ and $\angle C$, the center H of the circle A, and the circular arc generated by the intersection points $U_B$ and $U_C$ on the circumference of the circle A meet.

10. The positioning system of claim 8, wherein the correction module is configured to set the corrected terminal position based on a length of the circular arc of the circle A defined by the intersection points $U_B$ and $U_C$ and the ratio between the radii of the remaining two circles B and C when the number of the intersection points of the intersection point acquisition module is two.

11. The positioning system of claim 10, wherein the correction module is configured to divide the length of the circular arc of the circle A determined by the intersection points $U_B$ and $U_C$ in the ratio between the radii of the two circles B and C, and then set a position on the circumference of the divided circle A as the corrected terminal position.

12. The positioning system of claim 7, wherein the intersection point acquisition module is configured to
    derive, when the number of the acquired intersection points is one or fewer, intersection points $U_B'$ and $U_C'$ on a circumference of the circle A' generated based on the RSSI with respect to straight lines M and N of the valid indoor area based on the indoor positioning sensor with the smallest received signal among the valid indoor areas set based on the multiple indoor positioning sensors, and
    the correction module is configured to
    divide an interior angle $\angle A'$ formed by the derived intersection points $U_B'$ and $U_C'$ and a center of the circle A' in a ratio between radii of the remaining two circles B' and C' determined based on the RSSIs to derive an angle $\angle B'$ and an angle $\angle C'$, and
    determine, as the corrected terminal position, an intersection point P' at which the derived angles $\angle B'$ and $\angle C'$, the center of the circle A', and a circular arc of the circle A' generated by the intersection points $U_B'$ and $U_C'$ meet.

13. The positioning system of claim 7, wherein the intersection point acquisition module is configured to derive, when the number of the acquired intersection points is one or fewer, intersection points $U_B'$ and $U_C'$ on a circumference of the circle A' generated based on the RSSI with respect to straight lines M and N of the valid indoor area based on the indoor positioning sensor with the smallest received signal among the valid indoor areas set based on the multiple indoor positioning sensors, and the correction module is configured to set, as the corrected terminal position, a position on a circular arc obtained by dividing a length of the circular arc of the circle A' defined by the intersection points $U_B'$ and $U_C'$ in a ratio between radii of the two circles B' and C'.

14. A method for terminal positioning using a system for terminal positioning according to claim 1, the method comprising:

generating distance circumferences respectively based on RSSIs of multiple indoor positioning sensors;

setting points on the distance circumferences and connects the points to generate multiple circumcenter triangles; and deriving circumcenters of the respective multiple circumcenter triangles and connecting the derived circumcenters to generate one incenter triangle, and estimating that an incenter of the generated incenter triangle is a position of a terminal.

15. The method of claim 14, wherein the circumcenters of the circumcenter triangles are respectively derived as intersection points of perpendicular bisectors of sides of the circumcenter triangles.

16. The method of claim 15, wherein the incenter of the incenter triangle is derived as an intersection point of bisectors of three angles of the incenter triangle.

\* \* \* \* \*